Figure 1:
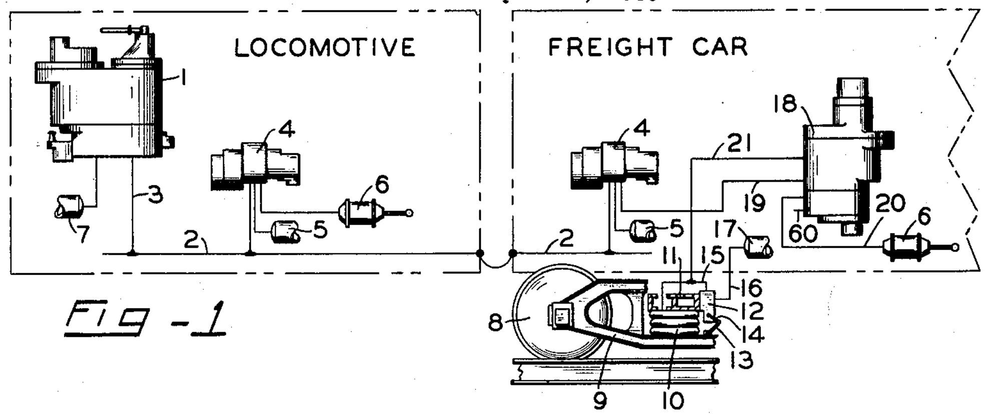

VARIABLE LOAD VEHICLE FLUID PRESSURE BRAKE SYSTEM

Filed Sept. 30, 1963

INVENTOR.
WILLIAM H. GLASS

BY *A. A. Steinmiller*
ATTORNEY

United States Patent Office 3,147,044
Patented Sept. 1, 1964

1

3,147,044
VARIABLE LOAD VEHICLE FLUID PRESSURE BRAKE SYSTEM

William H. Glass, Pittsburgh, Pa., assignor to Westinghouse Air Brake Company, Wilmerding, Pa., a corporation of Pennsylvania Filed Sept. 30, 1963, Ser. No. 312,539
6 Claims. (Cl. 303—22)

This invention relates to variable load vehicle fluid pressure brake systems employing relay valve devices sensitive to various load conditions of the vehicle and for effecting supply of fluid pressure to a brake cylinder of the fluid pressure brake system at a degree compatible with the load for effecting a brake application accordingly, and, more particularly, to such a brake system employing a relay valve device characterized by means whereby said valve device may be regulated not only to effect the desired braking results commensurate with the load of the vehicle, but to also compensate for any discrepancies or inconsistencies existing in the braking equipment mounted on said vehicle, it being possible to make such regulations while the valve device is actually in service and, therefore, not necessitating dismounting and disassembly of the valve device.

Vehicle load responsive relay valve devices, or variable load valve devices as they may be otherwise known, of the above-mentioned type are commonly used with air spring suspension systems on railway type vehicles and are operatively responsive to the pressure of fluid supplied to the air spring for supporting the particular load on the vehicle. Depending upon the degree of air spring pressure, which reflects the degree of vehicle load, the variable load valve device operates responsively to such degree of air spring pressure for effecting fluid pressure to the brake cylinder at a degree adequate for safely braking the vehicle according to the load carried thereon. Thus, the greater the vehicle load, the greater the degree of fluid pressure in the air spring for supporting the load, and, therefore, the greater is the pressure of fluid supplied to the brake cylinder for braking the vehicle.

Due to inconsistencies which may occur during the manufacturing processes of braking equipment for railways, slight variations in dimensions of the numerous ports and passageways formed in the various valve devices and other control equipment comprising the braking equipment may result. The capacities of fluid pressure reservoirs or of the brake cylinders themselves may vary to some extent although they may be rated at a certain predetermined capacity. Such slight inconsistencies do not render the equipment unusable, but, when a variable load relay valve device is incorporated therewith, it may be necessary to regulate or tune the variable load valve device when it is installed on any particular vehicle in order to compensate for any manufacturing inconsistencies existing in that particular braking equipment, and thereby assure proper functioning thereof for effecting the desired braking action on the vehicle compatible with the load thereon.

Of the various variable load valve devices presently in use, some, particularly those having spring-biased supply and exhaust valves, require that the spring compression or tension be set so that the valve will open or close responsively to the precise air spring pressure or

2 brake cylinder pressure, respectively, for providing the precise braking effect desired. Moreover, in making such setting to the particular type of variable load valve device presently under consideration, it may be necessary to disassemble the valve device in order to remove the biasing or main spring so that shims may be placed between the spring seat and the valve body for increasing the compression thereof or that shims may be removed to decrease the spring compression. During the time that such settings are made, it is necessary to exhaust the pressure from the valve device, dismantle it and therefore render it inoperable until the necessary settings have been made and it is reassembled and restored to operating condition. However, this method is a trial and error type of operation which may require several attempts at setting before the correct number of shims have been inserted into or removed from the variable load valve device to produce the correct or desired braking effect.

It is the principal object of this invention, therefore, to provide a variable load valve device having auxiliary regulating means for regulating the biasing means or main spring which, along with the degree of air spring pressure, determines the degree of fluid pressure at which the valve device responds for causing the supply valve therein to be opened and thereby effect supply of brake-applying pressure to the brake cylinder at a degree compatible with the vehicle load, said auxiliary means being so situated as to permit said main spring to be regulated externally of the valve device without necessitating disassembly thereof and while the valve device remains in an operating condition. The auxiliary regulating means may be utilized to either supplement or decrease the biasing effect of the main spring, depending upon whether the pressure range of brake cylinder operating fluid is too high to permit the combined opposing efforts of air spring pressure and the main spring to open the supply valve, or the combined forces of air spring pressure and the main spring are too high to permit the brake cylinder pressure to close the supply valve when the desired degree of brake cylinder pressure has been attained, respectively.

The invention, very briefly, comprises an improved variable load valve device including a supply valve carried by a piston stem which is fixed to a piston subjected on one side to air spring pressure and a main biasing spring and on the other side to brake cylinder pressure. As long as air spring pressure and main spring biasing force prevail on the one side of the piston, the supply valve is held unseated to permit brake-applying pressure to be supplied to the brake cylinder until such brake cylinder pressure acting on the other side of said piston builds up sufficiently to overcome the combined effects of air spring pressure and the main spring, at which point the supply valve is seated to cut off further supply to the brake cylinder. Should such brake cylinder pressure build up beyond the degree at which the supply valve is caused to be seated, such as when the vehicle load is reduced and air spring pressure is accordingly reduced, further movement of the piston causes an exhaust valve to open the brake cylinder to atmosphere for reducing pressure therein until equilibrium of forces on both sides of the piston is restored. According to the invention, the piston stem is provided with an extension on which an auxiliary spring, arranged in one manner, acts to assist the main spring and air spring pressure, and, when arranged in another manner, acts against said main spring and air spring pressure, the choice of arrangements depending upon the degree of operating air spring pressure relative to that of operating brake cylinder pressure. The auxiliary spring, which is provided with means for adjusting the compression thereof and thereby regulate the biasing effect of the main spring, is readily accessible so as to permit adjustment thereof by simply removing a cover cap and without removing the valve device itself from service during such time that adjustment is being made.

Figure 2:
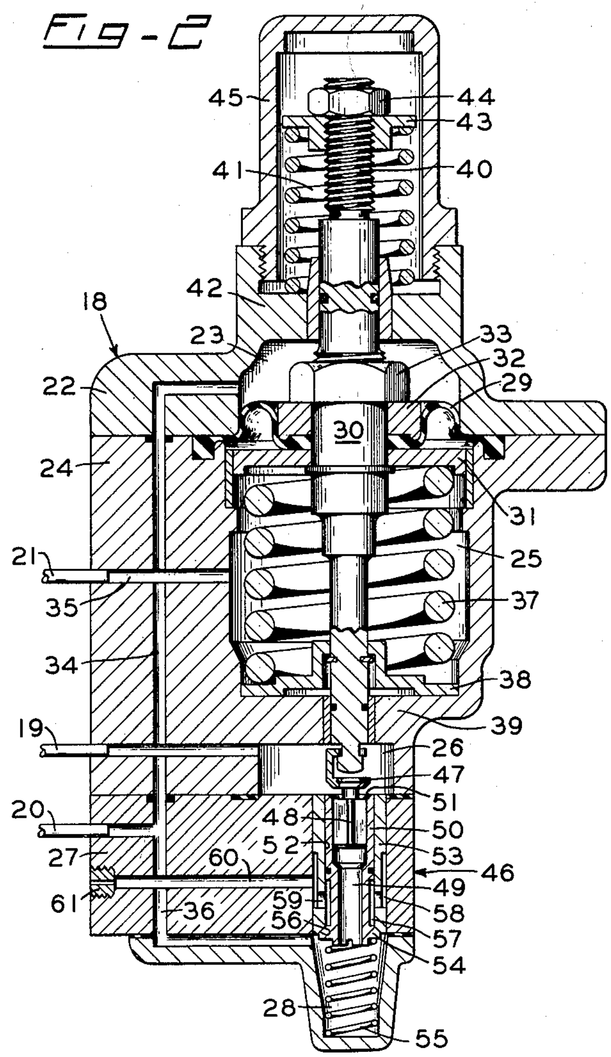
Figure 3:
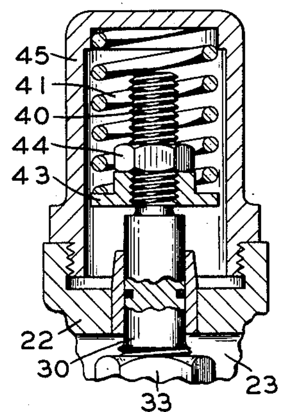

In the drawing, FIG. 1 shows a schematic arrangement of a fluid pressure operable brake system incorporating a variable load valve device embodying the invention;

FIG. 2 is an elevational view, on a larger scale and mostly in section, of the variable load valve device incorporated in the brake system shown in FIG. 1; and FIG. 3 is a sectional view of a portion of the valve device shown in FIG. 2 with certain components thereof arranged in a different manner than that shown in FIG. 2.

*Description and Operation*

A typical fluid pressure operable braking system for railway type vehicles is schematically shown in FIG. 1 wherein a locomotive and a freight car, for example, comprising a portion of a train are represented by respective phantom outlines and so designated. The brake equipment on the locomotive comprises an engineer's automatic brake valve device 1 of any well-known type manually operable by the engineer for controlling fluid pressure in a brake pipe 2 connected via a branch pipe or conduit 3 to said engineer's brake valve device. As is well known to those skilled in the art, operation of the engineer's brake valve device 1 for effecting a reduction of fluid pressure in the brake pipe 2 from a preselected normal value causes a brake control valve device 4 to effect supply of fluid under pressure from a source such as an auxiliary reservoir 5 to a brake cylinder device 6, whereby a brake application corresponding to the degree of reduction in brake pipe pressure is applied to the vehicle. Operation of the engineer's brake valve device 1 for effecting restoration of fluid pressure in the brake pipe 2 to the preselected normal value causes the brake control valve device 4 to effect venting of brake-applying pressure from the brake cylinder device 6 and thereby release of the brake application. The locomotive also carries a main reservoir 7 for storing fluid under pressure from a fluid compressor (not shown), said reservoir acting as a source of pressurized fluid for the entire brake system of the train.

Each of the cars making up the train is also provided with a brake control valve device 4, an auxiliary reservoir 5, and a brake cylinder device 6, all similar to those on the locomotive and, therefore, similarly designated, while the brake pipe 2 extends the entire length of the train so that the brakes on the entire train are controlled from the engineer's automatic brake valve device 1.

Also shown on the freight car in FIG. 1 is one of the car wheels 8 mounted on a truck frame 9, only a portion of which is shown, said truck frame constituting an unsprung portion of the car with an air spring 10 disposed between said unsprung portion and a bolster 11 constituting a sprung portion on which the vehicle center sill (not shown) and, therefore, the vehicle load rests. Also comprising a component of a typical air spring arrangement, as shown in FIG. 1, is a leveling valve device 12 mounted on the sprung portion 11 so that any relative movement between said sprung portion and the unsprung portion 9 is reflected through a pair of levers 13 and 14, one of said levers having one end pivotally connected to one end of the other lever, while the other end of said one lever is pivotally connected to said unsprung portion and the other end of said other lever is operatively connected to the leveling valve device.

The leveling valve device 12 is interposed between a delivery pipe 15 leading to air spring 10 and a supply pipe 16 coming from a pressurized fluid storage reservoir 17 and is operated, in a well-known manner to those skilled in the art, by pivotal movement of lever 14 resulting from relative movement between said lever 14 and lever 13 caused by relative movement between the sprung portion 11 and the unsprung portion 9. When the load condition of the vehicle is altered, the degree of pressurized fluid in the air spring (supplied thereto from said reservoir via said pipes) is either caused to be increased by an amount corresponding to the amount of increase of the height of the sprung portion of the vehicle is adjusted vehicle load, or to be reduced by an amount corresponding to the amount of reduction of vehicle load, whereby following any change in vehicle load so as to be maintained at a preselected or normal level relative to the sprung portion. Or, in other words, for any given increase in vehicle load, air spring pressure is increased accordingly, and for any given decrease in vehicle load, air spring pressure is reduced accordingly.

Each of the cars making up the train is equipped with a variable load valve device 18 operatively interposed between the brake control valve device 4 and the brake cylinder device 6 in a fluid pressure conduit or pipe comprising a supply section 19 leading from said brake control valve device and a delivery section 20 leading to said brake cylinder device, as shown in FIG. 1. The variable load valve device 18 is also connected via a pipe 21 to delivery pipe 15 between the leveling valve device 12 and air spring 10.

The variable load valve device 18, which may be seen in greater detail in FIG. 2, comprises an upper casing section 22, as viewed in the drawing, having formed therein a control chamber 23, an intermediate casing section 24 having formed therein a pressure chamber 25 and a supply chamber 26 and a lower casing section 27 having formed therein a delivery chamber 28 with a diaphragm type piston 29 separating said control chamber from said pressure chamber and having its outer periphery clamped between the upper and intermediate casing sections. The inner periphery of the diaphragm piston 29 is concentrically clamped about a piston stem 30 between a spring seat 31 adjacent its lower side and a piston follower 32 adjacent its upper side by a nut 33, the upper side of said piston being subjected to brake cylinder pressure in the control chamber 23, which is connected via a passageway 34 to delivery pipe 20, and the lower side of said piston being subjected to air spring pressure in pressure chamber 25, which is connected via a passageway 35 to pipe 21. Delivery pipe 20 is also connected to delivery chamber 28 via a branch 36 of passageway 34.

A main spring 37 of preselected compression value and encircling the piston stem 30, which extends coaxially downwardly from piston 29 through pressure chamber 25, is disposed in said pressure chamber between the upper spring seat 31, as viewed in the drawing, and a lower spring seat 38 resting against a separating wall 39 formed in intermediate casing section 24 between said pressure chamber and the supply chamber 26, said piston stem terminating at its lower end in said supply chamber. The lower side of piston 29, therefore, in addition to the force exerted thereon by air spring pressure prevailing in pressure chamber 25, is also subjected to the biasing action of main spring 37.

According to the invention, the piston stem 30 also extends coaxially upwardly from piston 29 through control chamber 23 and terminates with a screw-threaded portion 40 externally of upper casing section 22. An auxiliary spring 41 encircling the upper threaded portion 40 of piston stem 30 is disposed between an end wall 42 of upper casing section 22 and a screw-threaded spring seat member 43 positionably adjustable on said upper threaded portion of the piston stem for adjusting the compression of said auxiliary spring, the purpose of such adjustment to be disclosed hereinafter. A lock nut 44 is provided for securing the spring seat 42 in its adjusted position, and a cover cap 45 is removably carried by the upper casing section 22 for protectively enclosing the auxiliary spring 41 and its associated adjusting mechanism when adjustment thereof has been accomplished. The compression force of auxiliary spring 41 acts against the spring seat 43 to therefore exert an upwardly directed force, as viewed in the drawing, on the piston stem 30 coinciding directionally with and thereby assisting the forces of air spring pressure in chamber 25 and the compression force of main spring 37, all said forces acting to bias piston 29 upwardly, as will later be explained.

The lower casing section 27 houses a supply-exhaust valve assemblage 46 comprising a supply valve 47 operably engaged by the lower end of piston stem 30 in supply chamber 26, said supply valve having a coaxially extending fluted stem 48 slidably disposed in a central bore or passageway 49 extending coaxially through the entire length of a cylindrical exhaust valve member 50, said bore having an annular valve seat 51 surrounding one end thereof and opening to supply chamber 26, while the other end of said bore opens to the delivery chamber 28. Normally the supply valve 47 is held in an unseated or supply position off valve seat 51 whereby supply chamber 26 is in communication with delivery chamber 28 via central bore 49, said supply valve, however, being operable by piston stem 30 in a manner to be hereinafter disclosed to a seated or cut-off position on said valve seat to cut off such communication.

The cylindrical exhaust valve member 50 is slidably disposed in a bore 52 formed in a coaxially disposed bushing 53 fixed in lower casing section 27, said exhaust valve member having formed thereon an annular exhaust valve 54 surrounding the end of central bore 49 adjacent delivery chamber 28. The exhaust valve member 50 is axially biased, in an upward direction as viewed in the drawing, by a spring 55 disposed in delivery chamber 28 toward a closed position in which exhaust valve 54 occupies a seated or closed position on a complementary valve seat 56 formed on bushing 53. When the exhaust valve member 50 is operated axially downward to an open position, in a manner to be hereinafter described, exhaust valve 54 is moved to an unseated or exhaust position off valve seat 56 to thereby open delivery chamber 28 to atmosphere via an annular recess 57 formed externally on said exhaust valve member, an annular recess 58 formed externally on bushing 53 and registering with said annular recess 57 via openings 59 formed in said bushing, a vent passageway 60 formed in lower casing section 27 and a choke 61 interposed in said passageway.

As shown in FIG. 3, the auxiliary spring 41 may be arranged in such a manner as to have its biasing effect acting on piston 29 in a direction corresponding to that of brake cylinder pressure in control chamber 23 and in opposition to the forces of main spring 37 and air spring pressure in pressure chamber 25 for a purpose to be hereinafter disclosed. The screw-threaded spring seat member 43, as shown in FIG. 3, is preselectively axially positioned on the screw-threaded portion 40 of the piston stem 30 by screwing it thereon in an inverted disposition relative to that shown in FIG. 2, then locked in such preselected axial position by the lock nut 44. When the cover cap 45 is replaced, the auxiliary spring 41 is compressed between the end of said cover cap and the spring seat 43 to exert a compression force on the piston stem 30 and, therefore, on the piston 29, in a downward direction as viewed in the drawing, in accordance with the preselected axial position of said spring seat on the screw-threaded portion 40 of said piston stem.

If it is determined in advance that brake-applying or operating pressure supplied to brake cylinder 6 will be within a pressure range which, at both its maximum and minimum pressures and at any value therebetween, will exceed the combined efforts of maximum air spring pressure in pressure chamber 25 and the biasing effects of main spring 37, then the variable load valve device 18 is placed in operation with the auxiliary spring 41 arranged in the manner shown in FIG. 2, or what may be called a supporting position, in that it supplements the effects of the main spring and air spring pressure in chamber 25.

When the variable load valve device 18 embodying the invention is placed in operation, pipe 21 and, therefore, pressure chamber 25 are connected to the delivery pipe 15 via which pressurized fluid, as was noted above, is supplied to air spring 10, as effected by the leveling valve device 12, at a degree commensurate with vehicle load. Assuming the vehicle, such as the freight car illustrated in FIG. 1, to be fully loaded, a maximum degree of pressurized fluid commensurate with a full load is supplied to air spring 10 and also prevails in pressure chamber 25 to act on the lower side of piston 20 along with the forces exerted thereon by main spring 37 and auxiliary spring 41 acting through piston stem 30. Thus, piston 29 is biased upwardly to a supply position in which supply valve 47 is held in its unseated position. With a supply valve 47 in its unseated position, when a brake application is initiated by the operator by operating the automatic brake valve device 1 as above described to effect a reduction in brake pipe 2, brake-applying pressure at a value corresponding to the degree of such reduction in the brake pipe is supplied to supply pipe 19 from auxiliary reservoir 5 via the control valve device 4. Of course, in the absence of the variable load valve device 18, the degree of fluid pressure supplied to the brake cylinder 6 would be that determined by the amount of brake pipe reduction regardless of vehicle load condition. With the variable load valve device 18, however, interposed between the control valve device 4 and the brake cylinder 6, brake-applying fluid pressure is supplied to the brake cylinder device 6 via supply chamber 26, past unseated supply valve 47, via passageway 49, delivery chamber 28, passageway 36 and pipe 20 at a degree commensurate with vehicle load, as will be immediately explained. At the same time that brake-applying pressure is supplied to the brake cylinder 6, such pressure also builds up in control chamber 23 via passageway 34 connecting with passageway 36.

The degree of fluid pressure which builds up in control chamber 23 depends upon the degree of pressure prevailing in pipe 19 and supply chamber 26, which, in turn, depends upon the nature or type of brake application initiated by the operator, such as a "service" application or an "emergency" application, for example. Thus, if the operator initiates a light service application, for example, for merely slowing the train, the degree of fluid pressure prevailing in pipe 19 and supply chamber 26 and supplied therefrom past the unseated supply valve 47 to brake cylinder 6, is relatively low. This low degree of pressure, which also builds up in control chamber 23, may be insufficient for overcoming the combined opposing forces exerted by main spring 37, auxiliary spring 41 and air spring pressure in pressure chamber 25, said air spring pressure being at a maximum degree for a full load. The piston 29, therefore, will remain in its supply position to maintain supply valve 47 in its unseated position, since it may not be desirable to further reduce the degree of pressure supplied to the brake cylinder 6 from the low degree initiated by the operator due to the full load condition of the vehicle. On the other hand, if the operator initiates a brake application, such as a "full service" application, for example, for bringing the train to a normal stop, when the vehicle is half-loaded, for example, or even with a fully loaded vehicle, the degree of brake applying pressure initiated by the operator may be in excess of that actually required to bring the train to a stop.

Thus, if brake cylinder pressure in control chamber 23 builds up to a value sufficient for overcoming the combined efforts of air spring pressure in pressure chamber 25, main spring 37 and auxiliary spring 41, piston 29 is biased downwardly to a cut-off position in which supply valve 47 is moved to its seated position to cut off further supply of brake-applying pressure to both the brake cylinder 6 and the control chamber 23. The valve mechanism comprising the piston 29, stem 30 and supply valve 47 being of the self-lapping type, functions in the usual manner, when a state of equilibrium has been established between the respective forces acting on the upper and lower sides of piston 29, to maintain pressurized fluid in the brake cylinder 6 at a constant value. This value is established jointly, therefore, by the degree of pressure reduction in brake pipe 2 and by the degree of air spring pressure in pressure chamber 25 (according to vehicle load) to therefore effect a brake application not only influenced by the degree initiated by the operator, but also in accordance with vehicle load as reflected by air spring pressure.

If, during such time that a brake application is in effect on the car, the load on said car is lessened, reduction of air spring pressure is accordingly effected by the leveling valve device 12, and, therefore, pressure in the pressure chamber 25 of the variable load valve device 18 is accordingly reduced. With such reduction of air spring pressure in the pressure chamber 25, the state of equilibrium between the respective forces acting on the upper and lower sides of piston 29 is interrupted in that brake cylinder pressure in control chamber 23 now momentarily prevails over the combined forces of main spring 37, auxiliary spring 41 and the reduced air spring pressure in said pressure chamber. Since, as it will be recalled, supply valve 47 is seated on valve seat 51, the prevailing brake cylinder pressure in control chamber 23, in biasing piston 29 downwardly toward an exhaust position, causes said piston, acting through stem 30 and said seated supply valve, to move the exhaust valve member 50 downwardly and cause exhaust valve 54 to be operated to its exhaust position off valve seat 56. With exhaust valve 54 in its exhaust position, both brake cylinder 6 and control chamber 23 are vented to atmosphere via pipe 20 and passageway 34, respectively, and then commonly via passageway 36, delivery chamber 28 past the unseated exhaust valve 54, recess 57, openings 59, recess 58, vent passageway 60 and choke 61 until the pressure in both said brake cylinder and said control chamber has been reduced to a degree at which a state of equilibrium again exists between the opposing forces acting on the upper and lower sides of piston 29.

It should be apparent that in the event vehicle load is increased during such time that a brake application is in effect, the variable load valve device 18 functions, in a reverse manner to that immediately above discussed in connection with the lessening of vehicle load, for effecting a corresponding increase in brake-applying pressure supplied to the brake cylinder 6, if the supply valve 47 has been operated to its cut-off position under conditions above described, and then maintaining the attained value pending further change in vehicle load. If seating of the supply valve 47 has not been effected, then, of course, the existing brake cylinder pressure will continue to prevail.

In the event it is determined in advance that the air spring 10 of the particular equipment on the vehicle requires a relatively high degree of air spring pressure for supporting the particular type of vehicle and its load, and that said air spring pressure, even at its minimum value for supporting a vehicle with an empty load, is of such a high degree that the prevailing brake cylinder pressure in control chamber 23 would be ineffective against the combined forces of main spring 37, auxiliary spring 41 and air spring pressure in chamber 25 for operating piston 29 and, therefore, supply valve 47 to their respective cut-off positions, the auxiliary spring 41 should then be installed in the manner illustrated in FIG. 3 or what may be called a compensating position. In its compensating position, auxiliary spring 41 is compressed between the end of cover cap 45 and the spring seat member 43, which has been preselectively axially positioned on the screw-threaded portion 40 of the piston stem 30, so that the compression force of said auxiliary spring acts on said piston stem and piston 29 in a direction coinciding with that of brake cylinder pressure in control chamber 23 and in opposition to the forces of main spring 37 and air spring pressure in pressure chamber 25, thereby compensating for the high degree of said air spring pressure in said pressure chamber.

With the auxiliary spring 41 in its compensating position, the variable load valve device 18 functions in a manner similar to that discussed above when said auxiliary spring is in its supporting position, for controlling the degree of brake-applying pressure according to the degree of vehicle load.

Having now described the invention, what I claim as new and desire to secure by Letters Patent, is:

1. A variable load vehicle fluid pressure brake system comprising the combination of a brake cylinder device operable responsively to fluid pressure for effecting a brake application on the vehicle according to the degree of fluid pressure supplied thereto, an air spring chargeable with fluid at a pressure corresponding to the load on the vehicle, a source of fluid at a controlled pressure and a relay valve device, said relay valve device comprising:

(*a*) a casing, (*b*) a movable abutment mounted in said casing and forming therewith a control chamber and a pressure chamber on opposite sides respectively of said movable abutment, said pressure chamber being connected to said air spring and being charged with fluid pressure corresponding to that in the air spring, (*c*) a supply valve normally occupying a supply position, (*d*) an exhaust valve normally occupying a closed position, (*e*) means operatively connecting said movable abutment to said supply valve and said exhaust valve, (*f*) a main spring disposed in said pressure chamber for exerting a predetermined force, jointly with the air spring pressure prevailing in said pressure chamber, on said movable abutment and thereby urging it in one direction to operate said supply valve to its supply position in which it establishes a communication via which fluid under pressure flows from said source to said brake cylinder device, (*g*) passage means via which fluid at the pressure supplied to said brake cylinder device is communicated to said control chamber to exert on said movable abutment an oppositely directed force relative to the combined forces of said main spring and the air spring pressure prevailing in said pressure chamber, (*h*) stem means secured to said movable abutment, and (i) auxiliary spring means cooperating with said stem means to exert a supplemental force on said movable abutment in the same direction as that exerted by said main spring and said air spring pressure, (1) said movable abutment being operable, upon build-up of fluid pressure in said control chamber to a sufficient degree at which said oppositely directed force balances the combined forces of said main spring, auxiliary spring and air spring pressure, a certain amount, in a direction opposite to said one direction for operating said supply valve to a cut-off position in which further supply of pressurized fluid to said brake cylinder device is cut off, and (2) being operable, when the prevailing pressure in said control chamber exceeds said sufficient degree, beyond said certain amount for operating said exhaust valve to an open position in which fluid pressure in said control chamber and said brake cylinder device is reduced until the opposing forces acting on opposite sides of said movable abutment are restored to a state of balance.

2. A variable load vehicle fluid pressure brake system, as defined in claim 1, further characterized by means optionally arrangeable to cause said auxiliary spring to exert a force on said stem means either in the same direction or in an opposite direction as the force exerted by said main spring.

3. A variable load vehicle fluid pressure brake system, as defined in claim 2, further characterized in that said optionally arrangeable means is disposed exteriorly of said casing to provide accessibility for such optional arrangement during such time that the brake system is in operation.

4. A variable load vehicle fluid pressure brake system comprising the combination of a brake cylinder device operable responsively to fluid pressure for effecting a brake application on the vehicle according to the degree of fluid pressure supplied thereto, an air spring chargeable with fluid pressure at a degree corresponding to the load on the vehicle, a source of fluid at a controlled pressure and a relay valve device, said relay valve device comprising:

(*a*) a casing having formed therein:

(i) a pressure chamber connected to said air spring and subject to fluid pressure at a degree corresponding to that prevailing in the air spring, (ii) a supply chamber connectable to said source of fluid at a controlled pressure, (iii) a delivery chamber via which fluid pressure may be delivered from said supply chamber to the brake cylinder device, and (iv) a control chamber constantly in communication with said delivery chamber and subject to fluid pressure at a degree corresponding to that prevailing in said delivery chamber and in the brake cylinder device, (*b*) a piston member operably disposed between said control chamber and said pressure chamber and being subject on opposite sides thereof to the fluid pressures prevailing in said control chamber and in said pressure chamber, respectively, (*c*) a main spring disposed in said pressure chamber for exerting a predetermined biasing force on one side of said piston member adjacent the pressure chamber and supplementary to that exerted thereon by air spring pressure prevailing in said pressure chamber, (*d*) a piston stem extending externally of said casing from the side of said piston member opposite said one side, (*e*) an auxiliary spring selectively disposable in one position relative to said piston stem for exerting therethrough a variable biasing force on said piston member supplementary to the combined forces exerted thereon by said main spring and the air spring pressure prevailing in said pressure chamber, and in a different position for exerting a variable biasing force on said piston member supplementary to that exerted by prevailing brake cylinder pressure in said control chamber and in opposition to those exerted by the main spring and air spring pressure, (*f*) means for varying the compression of said auxiliary spring, whereby the biasing force exerted thereby may be varied accordingly, said auxiliary spring also being situated externally of said casing for providing access thereto and permitting positional and compression adjustment during such time that the brake system is in operation, (*g*) a supply valve operably disposed between said supply chamber and said delivery chamber, said supply valve being operable, by movement of said piston member in one direction responsively to preponderance of the forces acting on said one side, to a supply position in which said delivery chamber is in communication with said supply chamber, and being operable, upon a certain amount of movement of said piston member in a direction opposite to said one direction responsively to build-up of brake cylinder pressure in said control chamber to a sufficient degree at which the forces acting on opposite sides of said piston member are balanced, to a cut-off position in which communication between said supply chamber and said delivery chamber is cut off, and (*h*) an exhaust valve for controlling venting of said control chamber and said delivery chamber, and thereby the brake cylinder device, to atmosphere, said exhaust valve having a closed position in which said control and delivery chambers are cut off from atmosphere, and being operable, upon movement of said piston member in said opposite direction in excess of said certain amount responsively to fluid pressure in said control chamber in excess of said sufficient degree as caused by reduction of air spring pressure in said pressure chamber upon occurrence of a given vehicle load reduction, to an exhaust position in which said control chamber and the brake cylinder are opened and vented to atmosphere until the balance of forces on both sides of said piston member is restored, said exhaust valve being operable to its closed position upon restoration of said balanced condition of the piston member.

5. A relay valve device for establishing in a receiver a fluid pressure corresponding to a control fluid pressure, said relay valve device comprising:

(*a*) a casing, (*b*) a movable abutment mounted in said casing and forming therewith two chambers on opposite sides respectively of said movable abutment, one of said chambers being charged with the control fluid pressure, (*c*) a supply valve normally occupying a supply position, (*d*) an exhaust valve normally occupying a closed position, (*e*) means operatively connecting said movable abutment to said supply valve and said exhaust valve, (*f*) a main spring disposed in said one chamber for exerting a predetermined force, jointly with the control fluid pressure, on said movable abutment and thereby urging it in one direction to operate said supply valve to its supply position in which it establishes a communication via which fluid under pressure from a source of fluid under pressure flows to the receiver, (*g*) passage means via which fluid at the pressure supplied to the receiver is communicated to the other of said two chambers to exert on said movable abutment an oppositely directed force relative to the combined forces of said main spring and the control pressure, (*h*) stem means secured to said movable abutment, and (i) auxiliary spring means cooperating with said stem means to exert a supplemental force on said movable abutment in the same direction as that exerted thereon by said main spring and the control pressure, (1) said movable abutment being movable, upon build-up of fluid pressure in said other chamber to a sufficient degree at which said oppositely directed force balances the combined forces of the control pressure, main spring and auxiliary spring, a certain amount, in a direction opposite to said one direction for operating said supply valve to a cut-off position in which further supply of pressurized fluid to the receiver is cut off, and (2) being operable beyond said certain amount, when the prevailing pressure in said other chamber exceeds said sufficient degree for operating said exhaust valve to an open position in which fluid pressure in said other chamber and the receiver is reduced until the opposing forces acting on opposite sides of said movable abutment are restored to a state of balance.

6. A relay valve device, as defined in claim 5, further characterized by means optionally arrangeable to cause said auxiliary spring means to exert a force on said stem means either in the same direction or in an opposite direction as the force exerted by said main spring.

No references cited.